(12) United States Patent
Chen

(10) Patent No.: US 10,692,445 B2
(45) Date of Patent: Jun. 23, 2020

(54) METHOD FOR DRIVING DISPLAY APPARATUS WITH A PLURALITY OF GAMMA GRAYSCALE VALUE CURVE ALTERNATELY

(71) Applicants: HKC Corporation Limited, Shuitian Village, Shiyan Sub-district (CN); Chongqing HKC Optoelectronics Technology Co., Ltd., Chongqing (CN)

(72) Inventor: Wei Chen, Chongqing (CN)

(73) Assignees: HKC CORPORATION LIMITED, Shenzhen, Guangdong (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 16/068,397

(22) PCT Filed: Jan. 22, 2018

(86) PCT No.: PCT/CN2018/073597
§ 371 (c)(1),
(2) Date: Jul. 6, 2018

(87) PCT Pub. No.: WO2019/056679
PCT Pub. Date: Mar. 28, 2019

(65) Prior Publication Data
US 2019/0147810 A1    May 16, 2019

(30) Foreign Application Priority Data
Sep. 19, 2017    (CN) .......................... 2017 1 0851531

(51) Int. Cl.
G09G 3/36         (2006.01)
G02F 1/1368       (2006.01)
G09G 3/20         (2006.01)

(52) U.S. Cl.
CPC ......... G09G 3/3607 (2013.01); G02F 1/1368 (2013.01); G09G 3/20 (2013.01);
(Continued)

(58) Field of Classification Search
CPC .................................................. G09G 3/3607
(Continued)

(56) References Cited

U.S. PATENT DOCUMENTS

| 2008/0042578 A1* | 2/2008 | Arai ...................... G09G 3/3426 315/32 |
| 2009/0262106 A1* | 10/2009 | Lu ........................ G02F 1/13624 345/214 |

(Continued)

FOREIGN PATENT DOCUMENTS

| CN | 101226289 A | 7/2008 |
| CN | 103517054 A | 1/2014 |

(Continued)

OTHER PUBLICATIONS

International Search Report and Written Opinion dated Jun. 15, 2018, in International Application No. PCT/CN2018/073597.

*Primary Examiner* — Long D Pham
(74) *Attorney, Agent, or Firm* — Muncy, Geissler, Olds & Lowe, P.C.

(57) ABSTRACT

This application relates to a method for driving a display apparatus, includes: outputting an output image corresponding to an pixel signal; performing a corresponding grayscale value conversion processing on a pixel grayscale value of the output image; and converting, according to a gamma correction curve, the pixel grayscale value of the output (Continued)

image after the corresponding grayscale value conversion processing into a corresponding applied voltage, and scanning and outputting the corresponding applied voltage to a display panel, wherein the corresponding grayscale value conversion processing splits a gamma standard curve into a first gamma grayscale value corresponding curve and a second gamma grayscale value corresponding curve, and outputs the two curves to the output image in an alternate manner, where the output image is processed by using a grayscale value corresponding curve.

14 Claims, 7 Drawing Sheets

(52) U.S. Cl.
CPC ............ *G09G 3/36* (2013.01); *G09G 3/3677* (2013.01); *G09G 3/3688* (2013.01); *G09G 2300/0452* (2013.01); *G09G 2310/027* (2013.01); *G09G 2320/0276* (2013.01)

(58) Field of Classification Search
USPC .......................................................... 345/690
See application file for complete search history.

(56) References Cited

U.S. PATENT DOCUMENTS

| | | | |
|---|---|---|---|
| 2012/0306942 A1* | 12/2012 | Fujiwara | G09G 3/3413 345/690 |
| 2014/0085349 A1* | 3/2014 | Shiibayashi | G09G 5/10 345/690 |
| 2014/0306984 A1* | 10/2014 | Choi | G09G 5/06 345/591 |

FOREIGN PATENT DOCUMENTS

| | | |
|---|---|---|
| CN | 105321488 A | 2/2016 |
| CN | 105895044 A | 8/2016 |
| CN | 107564486 A | 1/2018 |
| KR | 20060104238 A | 10/2006 |
| KR | 20080109512 A | 12/2008 |

* cited by examiner

METHOD FOR DRIVING DISPLAY APPARATUS WITH A PLURALITY OF GAMMA GRAYSCALE VALUE CURVE ALTERNATELY

BACKGROUND

Technical Field

This application relates to a method for designing a display panel, and in particular, to a method for driving a display apparatus and a display apparatus.

Related Art

A liquid crystal display panel generally includes a color filter (CF) substrate, a thin film transistor array substrate (TFT Array Substrate), and a liquid crystal layer that is disposed between the two substrates. Its operating principle is to control, by applying a drive voltage to two glass substrates, a liquid crystal molecule on a liquid crystal layer to rotate, and refract light of a backlight module to generate an image. According to different orientation manners of liquid crystals, currently, liquid crystal display panels on a mainstream market may be divided into the following types: a vertical alignment (VA) type, a twisted nematic (TN) or super twisted nematic (STN) type, an in-plane switching (IPS) type, and a fringe field switching (FFS) type.

Liquid crystal displays of a VA mode include, for example, a patterned vertical alignment (PVA) liquid crystal display or a multi-domain vertical alignment (MVA) liquid crystal display. The PVA display achieves a wide viewing angle effect by using a fringing field effect and a compensation plate. The MVA display divides one pixel into a plurality of areas, and makes, by using a protrusion or a particular pattern structure, liquid crystal molecules in different areas tilt towards different directions, to achieve a wide viewing angle and improve a penetration transmittance.

Currently, liquid crystal displays are most widely used displays in markets, and in particular, widely used in liquid crystal televisions. As the resolution gradually increases, a size of a pixel is becoming smaller, an aperture ratio is also becoming smaller. For a large-sized product, there are relatively many angles available for viewing, and therefore a color cast phenomenon exists for a large viewing angle.

Currently, a viewing angle problem of a VA display panel becomes a main obstacle that impedes a high resolution of the VA panel, because in a case of high resolution panel design, a penetration transmittance and a viewing angle are factors restricting each other, and consideration can be given to only either of the two but not both.

Using a high definition 50-inch display panel as an example, if a color cast is made low and a viewing angle is increased, a penetration transmittance is 3.7%, and the viewing angle meets a requirement of a customer for 60 degrees on the left and right; if a conventional low color cast is not made, a penetration transmittance is already 5.1%, but the viewing angle cannot meet a requirement for 60 degrees on the left and right.

SUMMARY

To resolve the foregoing technical problem, an objective of this application is to provide a method for designing a display panel, and in particular, relate to a method for driving a display apparatus and a display apparatus to which the method is applied, so that not only a color cast problem can be effectively resolved, but also a viewing angle of a high resolution large-sized product can be effectively improved.

The objective of this application is achieved and the technical problem of this application is resolved by using the following technical solutions. A method for driving a display apparatus provided according to this application includes: outputting an output image corresponding to a pixel signal; performing a corresponding grayscale value conversion processing on a pixel grayscale value of the output image; and converting, according to a gamma correction curve, the pixel grayscale value of the output image after the corresponding grayscale value conversion processing into a corresponding applied voltage, and scanning and outputting the corresponding applied voltage to a display panel, wherein the corresponding grayscale value conversion processing splits a gamma standard curve into a first gamma grayscale value corresponding curve and a second gamma grayscale value corresponding curve, and outputs the first gamma grayscale value corresponding curve and the second gamma grayscale value corresponding curve to the output image in an alternate manner, where the output image is processed by using a grayscale value corresponding curve.

The objective of this application may further be achieved and the technical problem of this application may further be resolved by using the following technical solutions.

Another objective of this application is a method for driving a display apparatus, including: splitting a gamma standard curve into a first gamma grayscale value corresponding curve and a second gamma grayscale value corresponding curve; obtaining a pixel output signal corresponding result by using the first gamma grayscale value corresponding curve and the second gamma grayscale value corresponding curve; and deciding and controlling, according to the pixel output signal corresponding result, whether a plurality of drive circuit components enters a signal mode, where these drive circuit components include a plurality of first drive chips, a plurality of second drive chips, a power supply control chip, a brightness detector, and a digital-to-analog converter, and the signal mode means outputting grayscale value image data, where the grayscale value image data that is outputted is processed by using a grayscale value corresponding curve.

Still another objective of this application is a display apparatus, including: a first substrate; a second substrate, disposed opposite to the first substrate; and a drive circuit component, including a plurality of first drive chips, a plurality of second drive chips, a power supply control chip, a brightness detector, and a digital-to-analog converter, where the drive circuit component is disposed on the first substrate or the second substrate.

In an embodiment of this application, an energy required by the first gamma grayscale value corresponding curve and an energy required by the second gamma grayscale value corresponding curve are equal to an energy of a gamma standard curve.

In an embodiment of this application, at least either of the first or second gamma grayscale value corresponding curve is adjustable.

In an embodiment of this application, the gamma correction curve is adjustable.

In an embodiment of this application, a manner of the scanning is fully scanning and outputting an output image, and then fully scanning and outputting a next output image.

In an embodiment of this application, the display apparatus further includes a brightness detector, configured to detect a color luminance of the display panel.

In an embodiment of this application, the display apparatus further includes a digital-to-analog converter, configured to convert red, green, and blue digital signals into analog signals, and input the analog signals into pixel components of corresponding colors by using signal lines on the display panel.

In an embodiment of this application, the step of deciding and controlling, according to the pixel output signal corresponding result, whether a plurality of drive circuit components enters a signal mode includes: obtaining, by means of solution by using a gamma standard curve formula $X^{2.2}=X^b-X^H$, the first gamma grayscale value corresponding curve and the second gamma grayscale value corresponding curve corresponding to a grayscale value, where X is a current grayscale value, b is an exponential variable of a grayscale curve corresponding to each grayscale value, where H is a specified constant, and H is specified to 2.6.

In this application, when a panel penetration transmittance is not sacrificed, a viewing angle of a display panel is improved, and a color cast problem of the display panel is resolved, thereby improving product competitiveness.

DETAILED DESCRIPTION

The following embodiments are described with reference to the accompanying drawings, used to exemplify specific embodiments for implementation of this application. Terms about directions mentioned in this application, such as "on", "below", "front", "back", "left", "right", "in", "out", and "side surface" merely refer to directions in the accompanying drawings. Therefore, the used terms about directions are used to describe and understand this application, and are not intended to limit this application.

The accompanying drawings and the description are considered to be essentially exemplary, rather than limitative. In the figures, units with similar structures are represented by a same reference number. In addition, for understanding and ease of description, the size and the thickness of each component shown in the accompanying drawings are randomly shown, but this application is not limited thereto.

In the accompanying drawings, for clarity, thicknesses of a layer, a film, a panel, an area, and the like are enlarged. In the accompanying drawings, for understanding and ease of description, thicknesses of some layers and areas are enlarged. It should be understood that, for example, when a component such as a layer, a film, an area, or a base is described to be "on" "another component", the component may be directly on the another component, or there may be an intermediate component.

In addition, throughout this specification, unless otherwise explicitly described to have an opposite meaning, the word "include" is understood as including the component, but not excluding any other component. In addition, throughout this specification, "on" means that one is located above or below a target component and does not necessarily mean that one is located on the top based on a gravity direction.

To further describe technical means used in this application to achieve a preset inventive objective and technical effects of this application, specific implementations, structures, features, and effects of a method for driving a display apparatus and a display apparatus provided according to this application are described in detail below with reference to the accompanying drawings and preferred embodiments.

A display panel in this application may include a liquid crystal display (LCD) panel, including a thin film transistor (TFT) array substrate, a color filter (CF) substrate, and a liquid crystal layer formed between the two substrates, or is an organic light-emitting diode (OLED) panel or a quantum dots light-emitting diode (QLED) panel.

In an embodiment, the display panel in this application may be a curved-surface display panel.

In an embodiment, a TFT array and the CF in this application may be formed on a same substrate.

Figure 1:
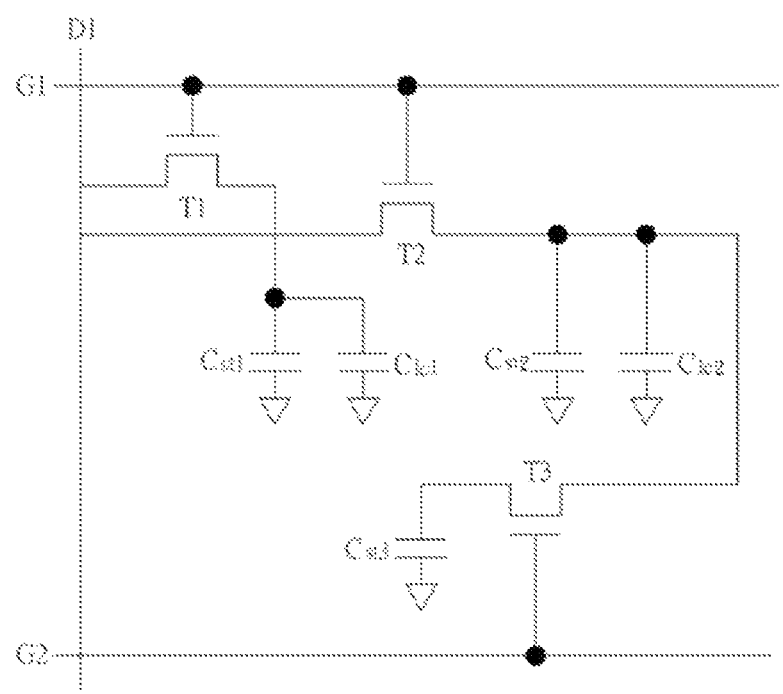
FIG. 1 is a diagram of an exemplary liquid crystal pixel circuit for which a color cast problem is resolved.

FIG. 1 is a diagram of an exemplary liquid crystal pixel circuit for which a color cast problem is resolved. In a liquid crystal display, enabling a plurality of capacitors in a pixel to share electric charge with each other is a technology derived for resolving a color cast problem. Referring to FIG. 1, in the liquid crystal pixel circuit shown in FIG. 1, a main pixel is controlled by a scanning line G1, to use a transistor T1 to obtain data from a data line D1 and store the data to a storage capacitor Cst1; and besides being controlled by the scanning line G1, to use a transistor T2 to obtain data from the data line D1 and store the data to a storage capacitor Cst2, a sub pixel is further controlled by a scanning line G2, to use a transistor T3 to enable the storage capacitor Cst2 and a storage capacitor Cst3 to share electric charge with each other. By using this architecture, the liquid crystal pixel circuit shown in FIG. 1 can properly control a ratio of a stored voltage of the storage capacitor Cst1 to a stored voltage of the storage capacitor Cst2, so as to enable a liquid crystal capacitor C1c1 and a C1c2 to be driven by a default voltage, and then enable a color cast problem during display to be eliminated. However, as technologies are updated, a liquid crystal display is improved in terms of both resolution and image update frequency. Therefore, no matter whether data in more pixel circuits needs to be updated within a same time due to increase of the resolution, or data in an original quantity of pixel circuits needs to be updated within a shorter time due to increase of the image update frequency, or even data in more pixel circuits needs to be updated within a shorter time due to increase of both the resolution and the image update frequency, in general, for each pixel circuit, a charging time that can be used when data in the data line D1 is stored to the storage capacitors Cst1 and Cst2 is accordingly reduced. Once the charging time that can be used for the pixel circuit is reduced, the storage capacitors Cst1 and Cst2 may not be fully charged, and consequently the storage voltages of the storage capacitors Cst1 and Cst2 may not reach a same level. Once the storage voltages of the storage capacitors Cst1 and Cst2 are different, after the storage capacitor Cst2 and the storage capacitor Cst3 share electric charge with each other, a ratio of a voltage maintained by the storage capacitor Cst2 to a voltage maintained by the storage capacitor Cst1 cannot reach an originally specified ratio. Therefore, the color cast problem that is originally wanted to be eliminated occurs during a display process again.

Figure 2:
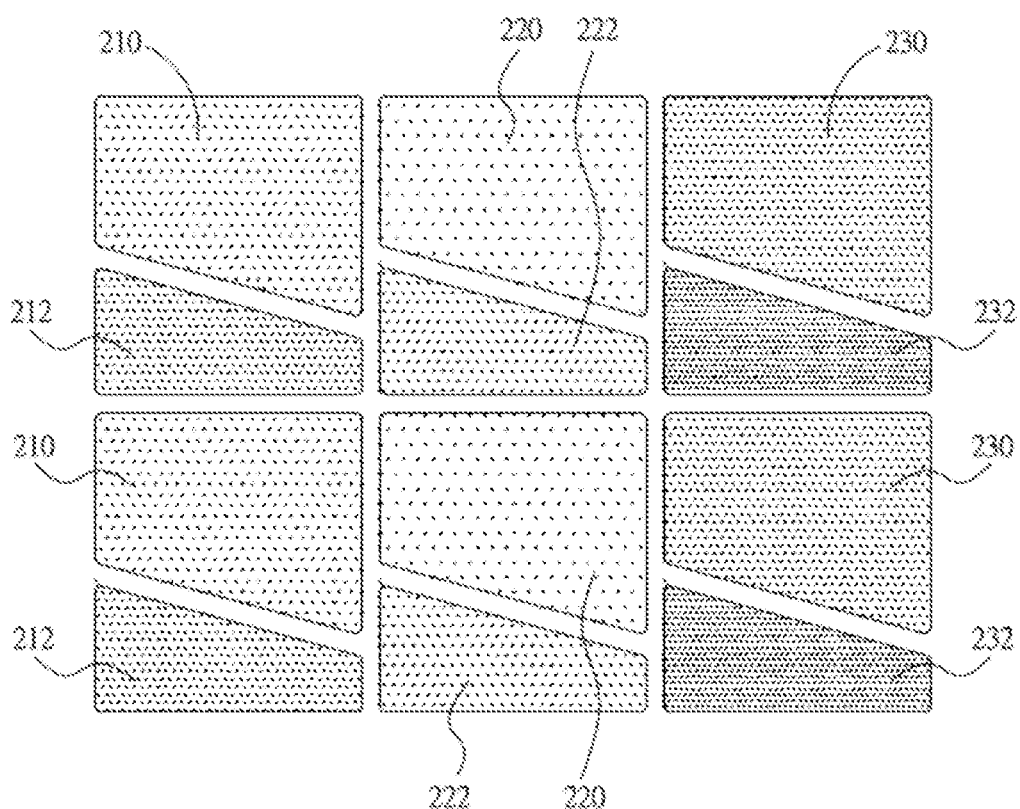
FIG. 2 is a schematic diagram of an exemplary area including main pixels and sub pixels.

FIG. 2 is a schematic diagram of an exemplary area including main pixels and sub pixels. Referring to FIG. 2, an area including main pixels and sub pixels, including: a main pixel 210 area and a sub pixel 212 area including red pixels, a main pixel 220 area and a sub pixel 222 area including green pixels, and a main pixel 230 area and a sub pixel 232 area including blue pixels.

Figure 3:
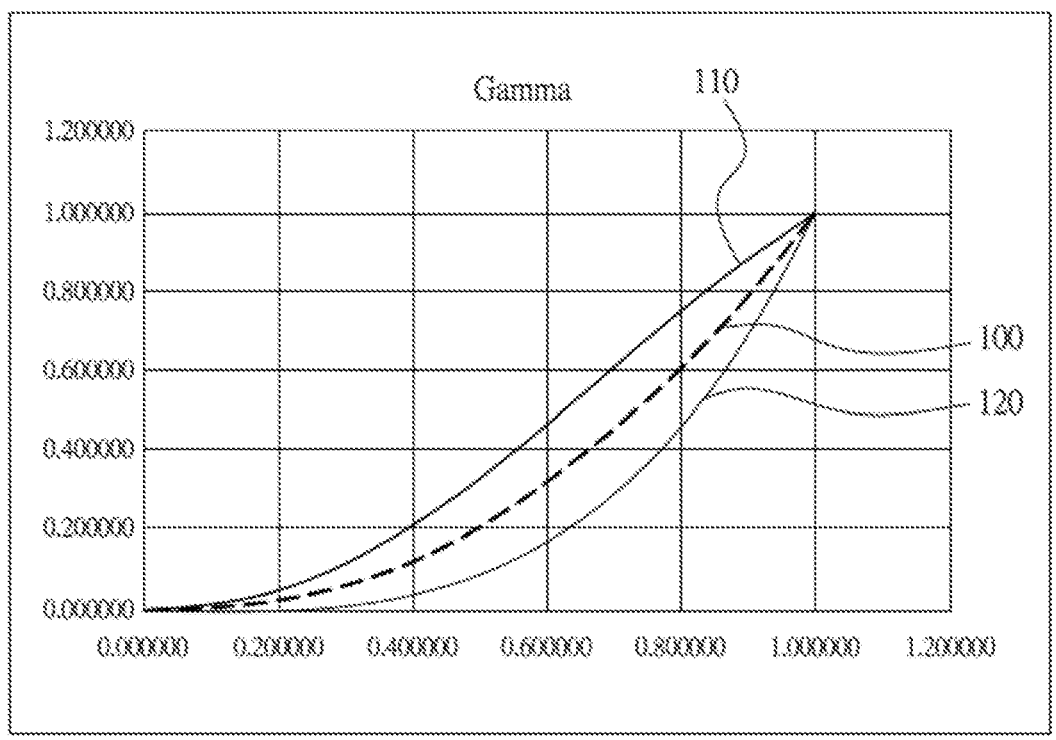
FIG. 3 is a schematic diagram of a gamma curve according to an embodiment of this application.
Figure 4:
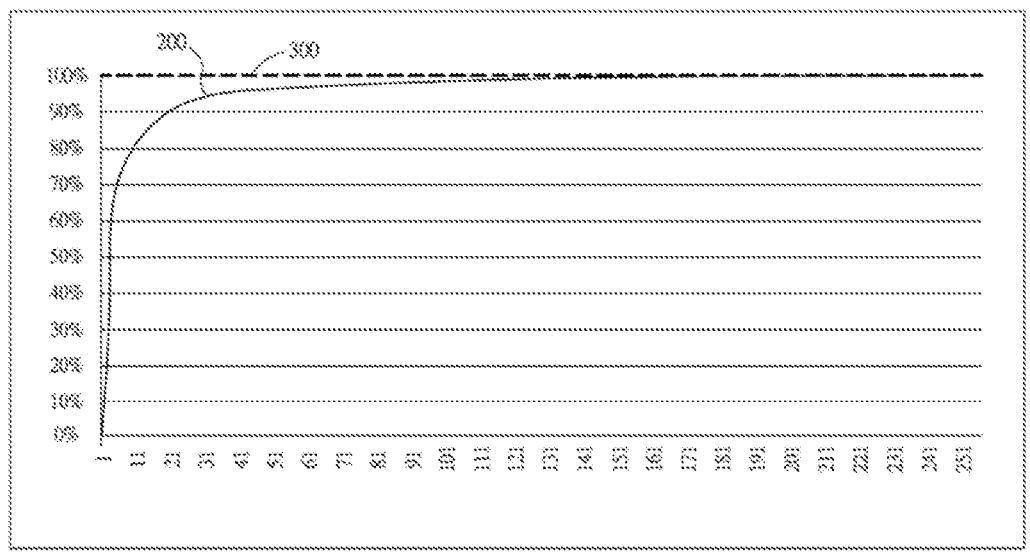
FIG. 4 is a schematic diagram of a grayscale value curve according to an embodiment of this application.

FIG. 3 is a schematic diagram of a gamma curve according to an embodiment of this application. FIG. 4 is a schematic diagram of a grayscale value curve according to an embodiment of this application. Referring to FIG. 3 and FIG. 4, a method for driving a gamma curve of a display device includes: outputting an output image corresponding to a pixel signal; performing a corresponding grayscale value conversion processing on a pixel grayscale value of the output image; and converting, according to a gamma correction curve 100, the pixel grayscale value of the output image after the corresponding grayscale value conversion processing into a corresponding applied voltage, and scanning and outputting the corresponding applied voltage to a display panel, wherein the corresponding grayscale value conversion processing splits a gamma standard curve into a first gamma grayscale value corresponding curve 110 and a second gamma grayscale value corresponding curve 120, and outputs the first gamma grayscale value corresponding curve 110 and the second gamma grayscale value corresponding curve 120 to the output image in an alternate manner, where the output image is processed by using a grayscale value corresponding curve.

In an embodiment, an energy required by the first gamma grayscale value corresponding curve and an energy required by the second gamma grayscale value corresponding curve are equal to an energy of a gamma standard curve.

In an embodiment, at least either of the first or second gamma grayscale value corresponding curve is adjustable.

In an embodiment, the gamma correction curve is adjustable.

In an embodiment, a manner of the scanning is fully scanning and outputting the output image, and then fully scanning and outputting next output image.

In an embodiment, the display apparatus further includes a brightness detector, configured to detect a color luminance of the display panel.

In an embodiment, the display apparatus further includes a digital-to-analog converter, configured to convert red, green, and blue digital signals into analog signals, and input the analog signals into pixel components of corresponding colors by using signal lines on the display panel.

Referring to FIG. 3 and FIG. 4, a method for driving a display apparatus includes: splitting a gamma standard curve 100 into a first gamma grayscale value corresponding curve 110 and a second gamma grayscale value corresponding curve 120; obtaining a pixel output signal corresponding result by using the first gamma grayscale value corresponding curve 110 and the second gamma grayscale value corresponding curve 120; and deciding and controlling, according to the pixel output signal corresponding result, whether a plurality of drive circuit components enters a signal mode, where these drive circuit components include a plurality of first drive chips, a plurality of second drive chips, a power supply control chip, a brightness detector, and a digital-to-analog converter, and the signal mode means outputting grayscale value image data, where the grayscale value image data that is outputted is processed by using a grayscale value corresponding curve.

Referring to FIG. 3 and FIG. 4, in an embodiment, according to the method for driving a display apparatus, the step of deciding and controlling, according to the pixel output signal corresponding result, whether a plurality of drive circuit components enters a signal mode includes: obtaining, by means of solution by using a gamma standard curve formula $100 \, X^{2.2} = X^b - X^H$, the first gamma grayscale value corresponding curve 110 and the second gamma grayscale value corresponding curve 120 corresponding to a grayscale value, where X is a current grayscale value, b is an exponential variable of grayscale curves 200 and 300 corresponding to each grayscale value, where H is a specified constant, and H is specified to 2.6.

In an embodiment, the method for driving a display apparatus further includes a display panel, configured to display an image.

Figure 5:
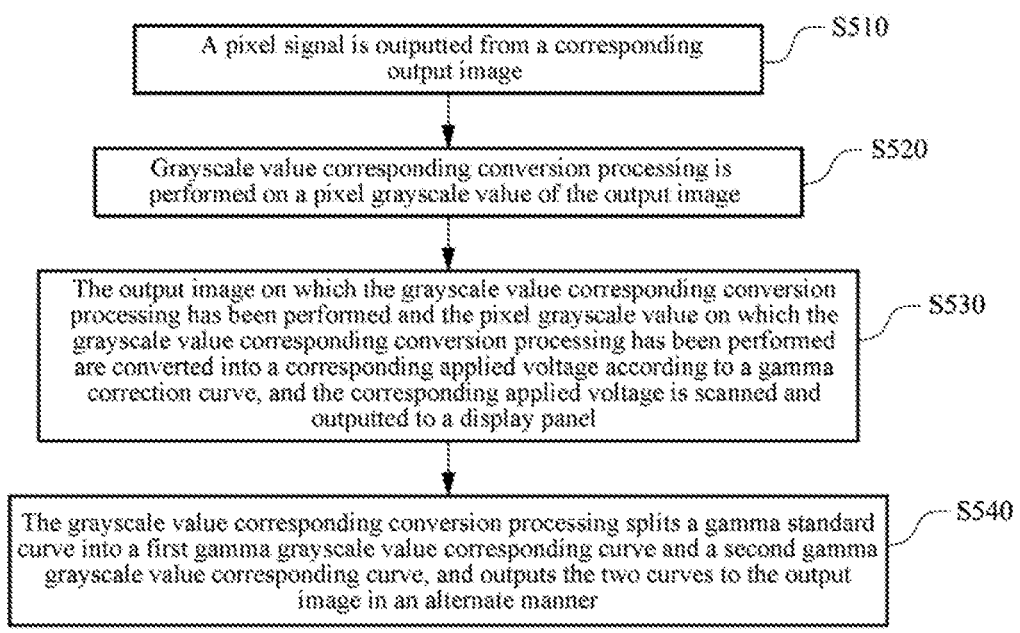
FIG. 5 is a flowchart of a method for driving a display apparatus according to an embodiment of this application.
Figure 6:
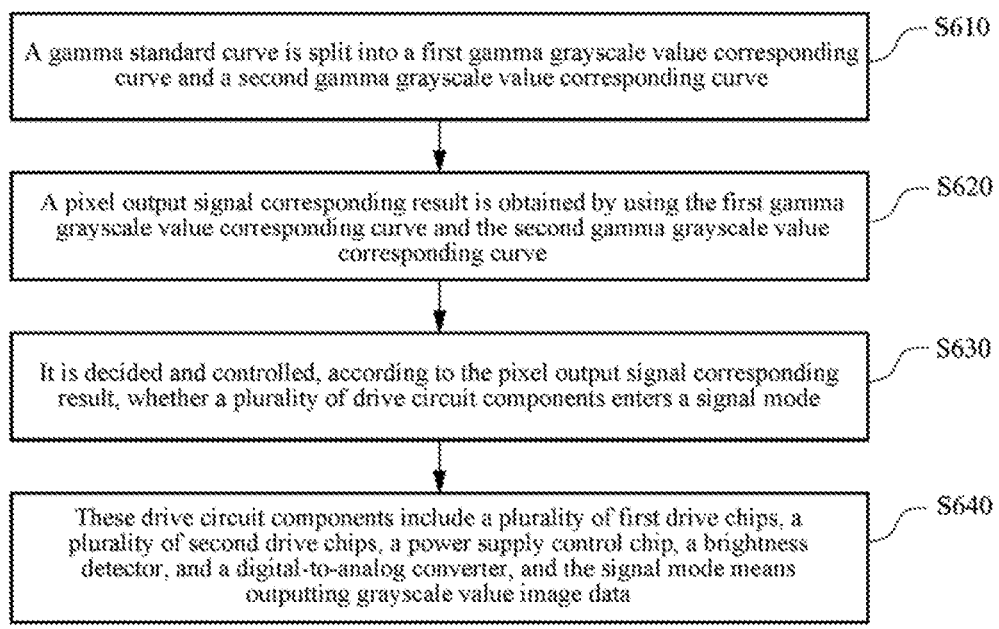
FIG. 6 is a flowchart of a method for driving a display apparatus according to another embodiment of this application.

FIG. 5 is a flowchart of a method for driving a display apparatus according to an embodiment of this application. FIG. 6 is a flowchart of a method for driving a display apparatus according to another embodiment of this application. Referring to FIG. 5, in step S510, a pixel signal is outputted from a corresponding output image.

Referring to FIG. 5, in step S520, the corresponding grayscale value conversion processing is performed on a pixel grayscale value of the output image.

Referring to FIG. 5, in step S530, the output image on which the corresponding grayscale value conversion processing has been performed and the pixel grayscale value on which the corresponding grayscale value conversion processing has been performed are converted into a corresponding applied voltage according to a gamma correction curve, and the corresponding applied voltage is scanned and outputted to a display panel.

Referring to FIG. 5, in step S540, the corresponding grayscale value conversion processing splits a gamma standard curve into a first gamma grayscale value corresponding curve and a second gamma grayscale value corresponding curve, and outputs the two curves to the output image in an alternate manner.

Referring to FIG. 6, in step S610, a gamma standard curve is split into a first gamma grayscale value corresponding curve and a second gamma grayscale value corresponding curve.

Referring to FIG. 6, in step S620, a pixel output signal corresponding result is obtained by using the first gamma grayscale value corresponding curve and the second gamma grayscale value corresponding curve.

Referring to FIG. 6, in step S630, it is decided and controlled, according to the pixel output signal corresponding result, whether a plurality of drive circuit components enters a signal mode.

Referring to FIG. 6, in step S640, these drive circuit components include a plurality of first drive chips, a plurality of second drive chips, a power supply control chip, a brightness detector, and a digital-to-analog converter, and the signal mode means outputting grayscale value image data.

Referring to FIG. 3 and FIG. 4, a method for driving a display panel includes the method for driving a display apparatus.

Figure 7:
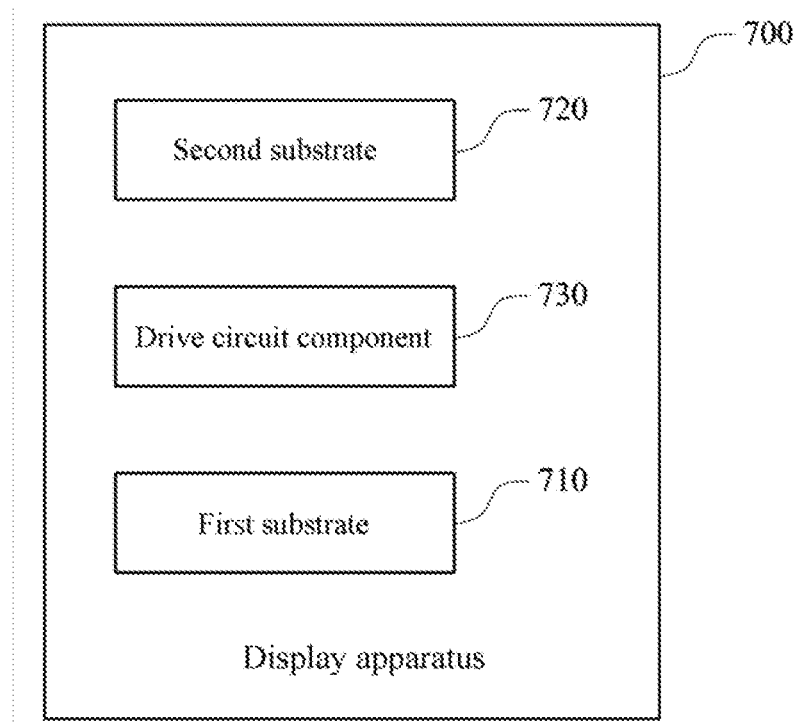
FIG. 7 is a module diagram if a display apparatus according to an embodiment of this application.

FIG. 7 is a module diagram if a display apparatus according to an embodiment of this application. Referring to FIG. 7, a display apparatus 700 includes: a first substrate 710; a second substrate 720, disposed opposite to the first substrate 710; and a drive circuit component 730, further including a plurality of first drive chips, a plurality of second drive chips, a power supply control chip, a brightness detector, and a digital-to-analog converter, where the drive circuit component 730 is disposed on the first substrate 710 or the second substrate 720.

In this application, when a panel penetration transmittance is not sacrificed, a viewing angle of a display panel is improved, and a color cast problem of the display panel is resolved, thereby improving product competitiveness.

Phrases such as "in some embodiments" and "in various embodiments" are repeatedly used. The wordings usually refer to different embodiments, but they may also refer to a same embodiment. Words, such as "include", "have", and "include" are synonyms, unless other meanings are indicated in the context.

The foregoing descriptions are merely preferred embodiments of this application, and are not intended to limit this application in any form. Although this application has been disclosed above through the preferred embodiments, the embodiments are not intended to limit this application. Any person skilled in the art can make some variations or modifications, namely, equivalent changes, according to the foregoing disclosed technical content to obtain equivalent embodiments without departing from the scope of the technical solutions of this application. Any simple amendment, equivalent change, or modification made to the foregoing embodiments according to the technical essence of this application without departing from the content of the technical solutions of this application shall fall within the scope of the technical solutions of this application.

What is claimed is:

1. A method for driving a display apparatus, comprising:
    outputting an output image corresponding to a pixel signal;
    performing a corresponding grayscale value conversion processing on a pixel grayscale value of the output image; and
    converting, according to a gamma correction curve, the pixel grayscale value of the output image after the corresponding grayscale value conversion processing into a corresponding applied voltage, and scanning and outputting the corresponding applied voltage to a display panel, wherein
    the corresponding grayscale value conversion processing splits a gamma standard curve into a first gamma grayscale value corresponding curve and a second gamma grayscale value corresponding curve, and outputs the first gamma grayscale value corresponding curve and the second gamma grayscale value corresponding curve to the output image in an alternate manner, wherein
    the output image is processed by using a grayscale value corresponding curve, and
    an energy required by the first gamma grayscale value corresponding curve and an energy required by the second gamma grayscale value corresponding curve are equal to an energy of a gamma standard curve.

2. The method for driving a display apparatus according to claim 1, wherein the first gamma grayscale value corresponding curve and the second gamma grayscale value corresponding curve are adjustable.

3. The method for driving a display apparatus according to claim 1, wherein the gamma correction curve is adjustable.

4. The method for driving a display apparatus according to claim 1, wherein a manner of the scanning is fully scanning and outputting the output image, and then fully scanning and outputting a next output image.

5. The method for driving a display apparatus according to claim 1, further comprising a brightness detector.

6. The method for driving a display apparatus according to claim 5, wherein the brightness detector is configured to detect a color luminance of the display panel.

7. The method for driving a display apparatus according to claim 1, further comprising a digital-to-analog converter.

8. The method for driving a display apparatus according to claim 7, wherein the digital-to-analog converter is configured to convert red, green, and blue digital signals into analog signals, and input the analog signals into pixel components of corresponding colors by using signal lines on the display panel.

9. A method for driving a display apparatus, comprising:
    splitting a gamma standard curve into a first gamma grayscale value corresponding curve and a second gamma grayscale value corresponding curve;
    obtaining a pixel output signal corresponding result by using the first gamma grayscale value corresponding curve and the second gamma grayscale value corresponding curve; and
    deciding and controlling, according to the pixel output signal corresponding result, whether a plurality of drive circuit components enters a signal mode, wherein
    these drive circuit components include a plurality of first drive chips, a plurality of second drive chips, a power supply control chip, a brightness detector, and a digital-to-analog converter, and the signal mode means outputting grayscale value image data, wherein
    the grayscale value image data that is outputted is processed by using a grayscale value corresponding curve, and
    an energy required by the first gamma grayscale value corresponding curve and an energy required by the second gamma grayscale value corresponding curve are equal to an energy of a gamma standard curve.

10. The method for driving a display apparatus according to claim 9, wherein the step of deciding and controlling, according to the pixel output signal corresponding result, whether a plurality of drive circuit components enters a signal mode comprises:
    obtaining, by means of solution by using a gamma standard curve formula $X^{2.2}=X^b-X^H$, the first gamma grayscale value corresponding curve and the second gamma grayscale value corresponding curve corresponding to a grayscale value, wherein X is a current grayscale value, b is an exponential variable of a grayscale curve corresponding to each grayscale value, and
    wherein H is a specified constant, and H is specified to 2.6.

11. The method for driving a display apparatus according to claim 9, further comprising a display panel, configured to display an image.

12. The method for driving a display apparatus according to claim 9, wherein the brightness detector is configured to detect a color luminance of the display panel.

13. The method for driving a display apparatus according to claim 9, wherein the first gamma grayscale value corresponding curve is adjustable.

14. The method for driving a display apparatus according to claim 9, wherein the second gamma grayscale value corresponding curve is adjustable.

* * * * *